United States Patent [19]

Van der Velden

[11] Patent Number: 5,215,155
[45] Date of Patent: Jun. 1, 1993

[54] WEIGHING DEVICE FOR CONTAINERS TO BE MOVED BY AN ARM SYSTEM

[75] Inventor: Henricus F. M. Van der Velden, Oss, Netherlands

[73] Assignee: Mettler-Toledo A.G., Greifensee, Switzerland

[21] Appl. No.: 836,871

[22] Filed: Feb. 19, 1992

[30] Foreign Application Priority Data

Mar. 5, 1991 [NL] Netherlands .................. 9100395

[51] Int. Cl.⁵ ............................................. G01D 15/00
[52] U.S. Cl. ................................. 177/145; 177/256; 177/257
[58] Field of Search ............... 177/145, 256, 257, 139

[56] References Cited

U.S. PATENT DOCUMENTS

| | | | |
|---|---|---|---|
| 4,465,211 | 8/1984 | van der Lely et al. | 177/145 X |
| 4,645,018 | 2/1987 | Garbade et al. | 177/139 X |
| 4,714,122 | 12/1987 | Appleton et al. | 177/139 |
| 5,067,572 | 11/1991 | Kyrtsos et al. | 177/139 |

FOREIGN PATENT DOCUMENTS

| | | |
|---|---|---|
| 0255624 | 2/1988 | European Pat. Off. |
| 0292866 | 11/1988 | European Pat. Off. |
| 0402352 | 12/1990 | European Pat. Off. |
| 0483922 | 5/1992 | European Pat. Off. |
| 1895347 | 6/1964 | Fed. Rep. of Germany |
| 3819169 | 12/1989 | Fed. Rep. of Germany |
| 3903592 | 8/1990 | Fed. Rep. of Germany |
| WO88/02849 | 4/1988 | World Int. Prop. O. |

Primary Examiner—Benjamin R. Fuller
Assistant Examiner—R. Gibson
Attorney, Agent, or Firm—Young & Thompson

[57] ABSTRACT

Weighing device for weighing a container to be moved by at least one arm system with a lifting device, comprising a support, a lifting arm pivotally connected at one end to the support, and a weighing arm pivotally connected to the lifting arm at one end of the weighing arm adjacent the point of connection of the lifting arm to the support. The other end of the weighing arm detachably supports a container to be weighed. A load cell assembly is disposed and acts between the other end of the lifting arm and the weighing arm adjacent support for the container.

7 Claims, 3 Drawing Sheets

WEIGHING DEVICE FOR CONTAINERS TO BE MOVED BY AN ARM SYSTEM

The present invention relates to a weighing device for weighing a container to be moved by at least one arm system with lifting devices, comprising a measuring cell fitted in said arm system, said arm system being swivellably fixed to a support.

Such a weighing device is generally known in the state of the art. It is used, for example, on lorries for taking away containers. Such lorries are provided with lifting arms with chains on the ends for fastening to the container concerned. Measuring cells or load cells are provided between the chain and the lifting arm. The use of chains ensures that the measuring cell is always loaded in the correct direction. In the case of measuring cells it is important that they should be loaded in only one direction because the measuring cell cannot process accurately or at all other components of forces acting on it, with the result that inaccuracies occur.

It follows from the above that the device according to the state of the art is suitable only for measuring the weight of a container using a flexible connection between the lifting arm and the container. However, this involves the time-consuming fastening of such flexible connections to containers. This additional work does not matter in the case of relatively large containers where only one or several are placed on a lorry.

For use in refuse collection lorries and the like, into which very many small containers are emptied, a rapid coupling of the arm system to the container does matter. For this purpose, so-called roller containers are proposed in the state of the art, said containers having at the side wall a projecting catch part under which the lifting arm can engage, and about which the container in question can tilt. With the aid of a pull rod, when the container is moved upwards it is tilted near the unloading position, so that the material present in the container can be transferred to the lorry in question.

Measuring the weight is becoming increasingly important, particularly for the processing of chemical waste. The most commonly used method of determining the weight involves moving the lorry to a weighbridge after each loading operation and measuring the increase in weight. It will be clear that such an operation involves great additional cost and is time-consuming. Increasing attempts are being made by authorities to make consumers pay for the type and weight of the waste which they wish to have collected.

The object of the present invention is to provide a weighing device which does not have the above-mentioned disadvantages, i.e. with which it is possible to determine the weight of a container without it being necessary to fit flexible devices between the measuring cell and the container in question.

This object is achieved in a weighing device of the type described above in that said arm system comprises:

a lifting arm which is hingedly connected at one end to said support and extends at the other end almost to the engagement point of the container, on which lifting arm the lifting devices act;

a weighing arm which at one end is hingedly fixed to the lifting arm near the hinge point of the lifting arm with the support, and at the other end is provided with the engagement point for the container; and a measuring cell provided in order to act between the weighing arm and the lifting arm near the engagement point for the container.

The invention is based on the idea that an accurate measurement can be achieved by using two arms extending in the same direction, with the force of the weighing arm being guided towards the lifting arm. Due to the great distance between the hinge point of the weighing arm to the lifting arm and the engagement point of the weighing arm on the container, the influence of components which cannot be determined by the measuring cell are negligible, and there is only pure tension or compression.

Of course, it is possible to make the arm system double, in order to be able to accommodate a container, such as a roller container, between the two systems.

Since it is important that only pure tension or compressure acts across the load cell, according to an advantageous embodiment of the invention, means for determining the angle of inclination can be present in the arm system. These indicate when the measuring cell is in its optimum measuring range. The system of lifting arm and weighing arm can also be adapted in such a way that for the highest container measuring in optimum conditions as regards the measuring cell is always possible.

It is also possible to detect forces not acting purely vertical to the measuring cell by means of a further cell provided in the weighing arm, which acts in a direction essentially at right angles to the first measuring cell. The measuring cell can comprise all devices known in the state of the art, such as those operating with strain gauges. In view of the large angle range over which accurate measurement takes place, it is preferable to use a measuring cell operating by the shear measuring principle. Its design permits 5 to 10% obliqueness of the force introduction.

Although when the forces are being introduced the measuring cell can be subjected to both tension and compression, it is preferable for the weighing arm to be disposed above the lifting arm, so that the force is recorded as a compression force. Of course, this force can be converted to a tension force inside the measuring cell.

The invention will be explained in greater detail below with reference to an example of an embodiment shown in the drawings in which.

Figure 1:
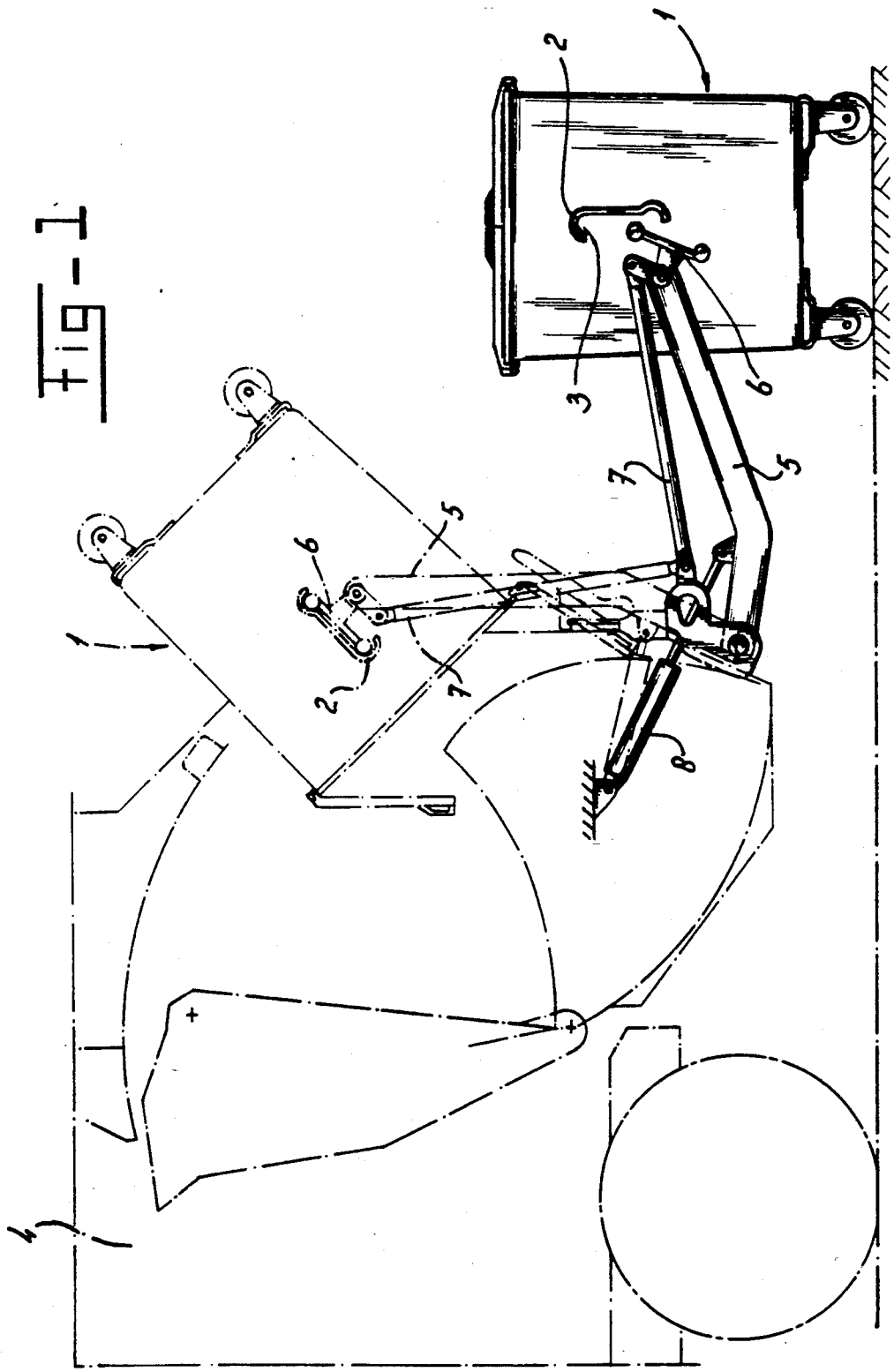
FIG. 1 shows a container tilting and unloading system according to the state of the art.

In FIG. 1 a container to be unloaded is indicated by 1. It has catch parts 2 provided with a socket 3 projecting on both sides. This container is in the form of a so-called roller container, and the aim is to empty such a container into a lorry 4, which is shown only schematically. This lorry is provided on the rear side with a lifting device for containers 1, the most important parts of which will be discussed below. The situation during unloading of the container into the lorry is shown by dashed lines, while the engagement is shown by solid lines.

The arm system for picking up the container near catch parts 2 in socket 3 comprises a hingedly fitted lifting arm 5. It is provided on its end with a push-in element 6 which can engage in socket 3. Push-in element 6 is hingedly connected to lifting arm 5, and at the other side is hingedly connected to pull rod 7. Pull rod 7 is also hingedly fixed on the rear side of the lorry, but the hinge point in the position shown in FIG. 1 lies closer to the container than the hinge point of lifting arm 5. The engagement and tilting movement of push-in element 6 can consequently be achieved during lifting of the container 1. Arm 5 is taken upwards by means of a hydraulic jack unit 8.

Figure 2:
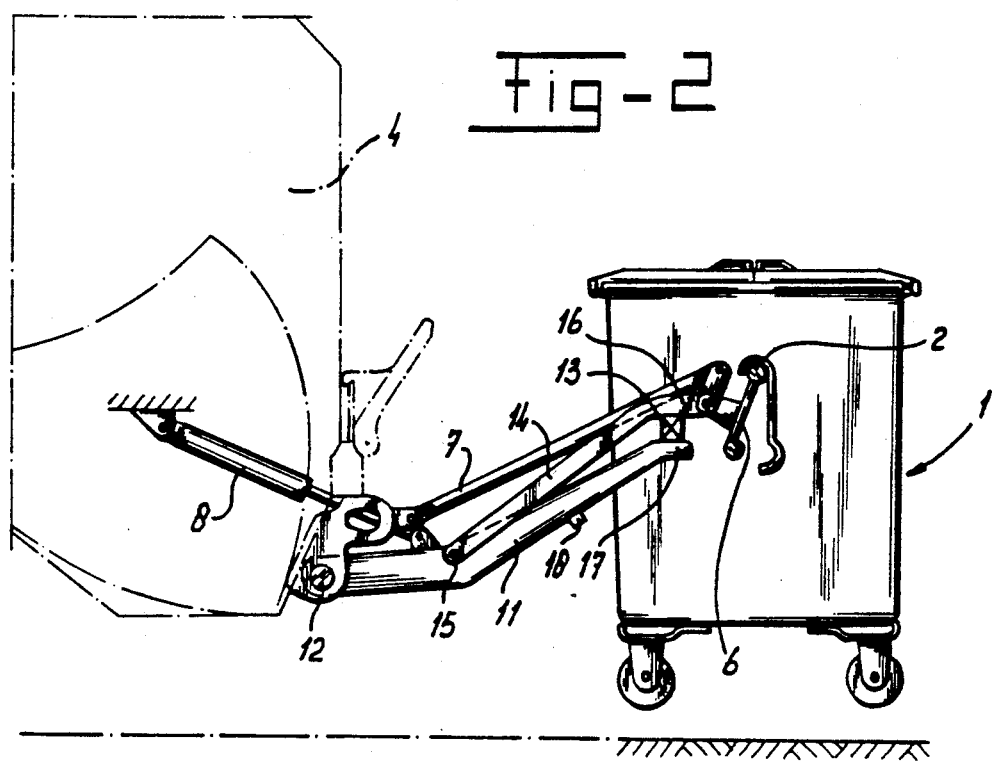
FIG. 2 shows schematically the device according to the present invention, in a first embodiment.

FIG. 2 shows schematically the device according to the invention. Parts corresponding essentially to FIG. 1 are provided with the same reference numbers.

In FIG. 2 the object is also to empty a container 1 into a lorry 4. For this, a push-in element 6 and a pull rod 7 are also present. This pull rod is loaded only when container 1 is raised a considerable height above the ground.

The device according to FIG. 2 is also provided with a jack 8. The arm system for lifting the container is, however, differently designed. It comprises a lifting arm 11 which at one side is hingedly connected at 12 to the lorry or some other part which can be regarded as fixed. At the other end the rigid lifting arm 11 is coupled to a measuring cell 13. A weighing arm 14 is fitted in a hinged manner to the lifting arm 11 as close as possible to lorry 4. The hinge point is indicated by 15. The other end of hinge arm 14 is connected in the same hinged manner as in FIG. 1 to push-in element 6. Weighing arm 14 is connected near its end to measuring cell 13. Jack 8 engages on lifting arm 11. Weighing arm 14 and lifting arm 11 are provided near the right end in FIG. 2 with a bend, indicated by 16 and 17 respectively, between which the measuring cell 13 is fitted. Angle measuring devices 18 are also fitted in lifting arm 11.

The device described above according to FIG. 2 works as follows: For lifting from the ground, the arm system composed of weighing arm 14 and lifting arm 11 is moved upwards so far that the ends 16 and 17 are essentially horizontal. This can be observed visually, but also by the angle measuring device 18 present on lifting arm 11. In this position measuring cell 13 is in a state in which the measurement takes place in the most accurate manner, i.e. all forces can be introduced in the optimum manner for the measuring cell in question. As an example of the measuring cell, TOLEDO measuring cells, series 6 XX 1 are mentioned here. It is, of course, possible to use other measuring cells.

The flanging at the ends 16 and 17 is selected in such a way that even the highest container can be measured accurately. Lower containers will be lifted farther from the ground before measurement is achieved. In the measuring position pull rod 7 is not yet operational, so that it is not yet taking any forces. Only when the arm system is placed in the position shown by dashed lines in FIG. 1 will pull rod 7 take forces. Through relieving pull rod 7 of its load within a measuring path lying between the lowest position of the lifting arm and a selected upper position of the lifting arm 11, the pull rod 7 together with weighing arm 14 and push-in element 6 will form a fixed preload for the measuring cell, which load can be tared out. In this example this load removal can be found by making the hinge point by which the pull rod 7 is connected to the lorry move into a recess of the pull rod 7. If within the above-mentioned path the push-in element 6 is prevented from tilting farther backwards (against the weighing arm), an object to be weighed can then be lifted up normally.

Figure 3:
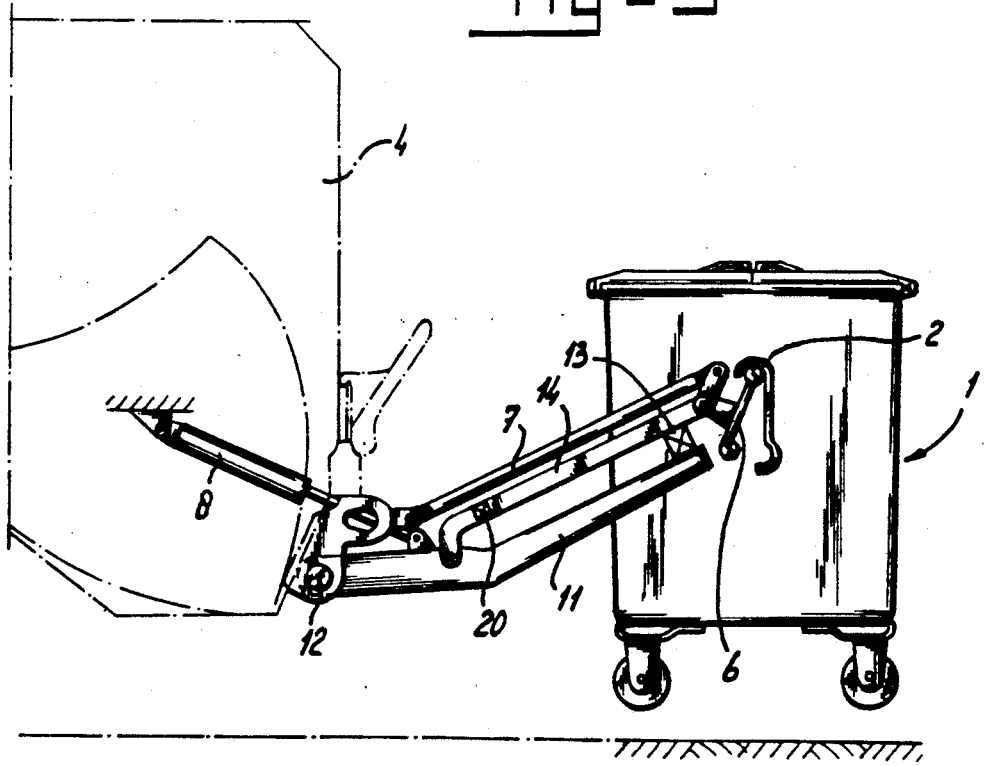
FIG. 3 shows schematically a second embodiment according to the present invention.

In order to avoid the flanging 16, 17 of the weighing arm 14 and lifting arm 11 respectively, and to be able to measure in all positions, a further measuring cell 20 is fitted in the weighing arm in FIG. 3. The measuring range of this weighing cell 20 is preferably at right angles to the measuring range of the measuring cell 13. In this way forces applied to the weighing arm 14, can be measured split into two components by measuring cells 13 and 20, and the weight of the container can be determined by means not shown, which are generally known in the state of the art. This makes dynamic weighing possible.

Figure 4:
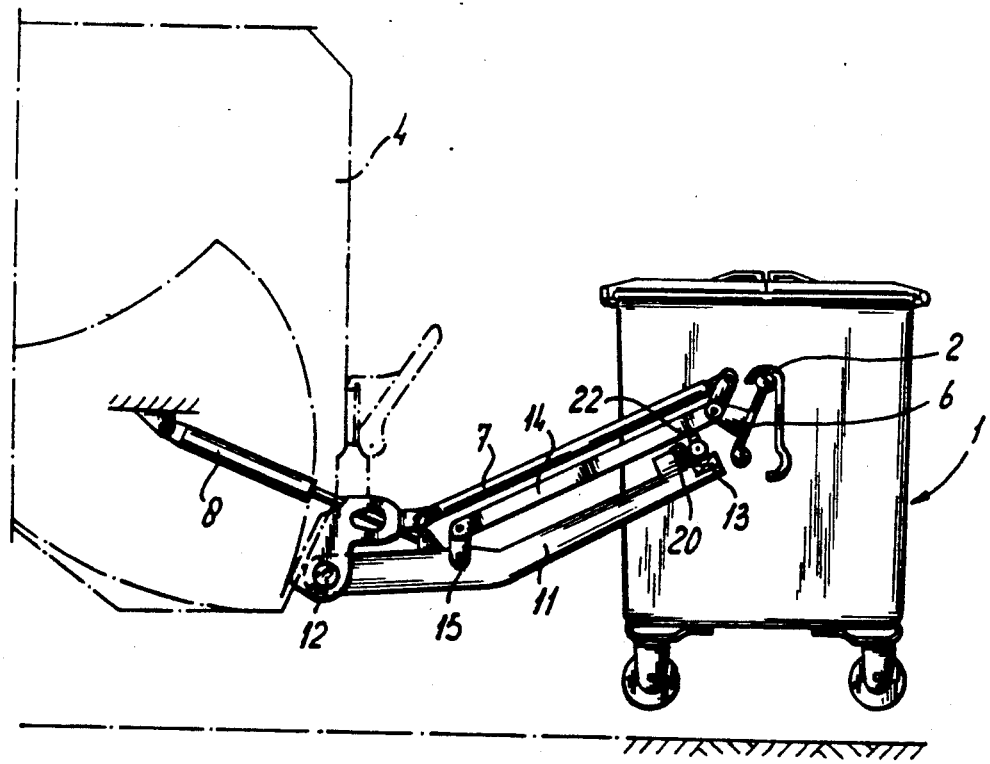
FIG. 4 shows schematically a further embodiment according to the present invention.

FIG. 4 shows a further embodiment of the device according to the invention. In this case the further measuring cell indicated by 20 in FIG. 3 in order to make dynamic weighing possible is fitted in weighing arm 11. The force introduction directions of the measuring cells 13 and 20 are in this case placed at an angle of 90° relative to each other. Through the provision of a forcedividing roller bearing 22 which is fixed to the weighing arm 14, and of which the centre lies exactly opposite the introduction point of the cells 13 and 20, the forces will spread over said cells according to a value to be calculated in advance depending on the angle of the recorders with the vertical.

After determination of the weight of the container, the data thereof can, if desired, be processed further together with the data of the container itself in any way known in the state of the art.

Although the invention is explained above with reference to examples of embodiments shown in the drawings, it must be understood that numerous modifications can be made to it without going beyond the scope of the present application. For example, it is possible to fit the weighing arm below the lifting arm. It is also possible to select the position of the hinge point 15 elsewhere on the lifting arm 11. All that is important is that the weighing arm must be selected long enough for it to be loosely supported on measuring cell 13. All these modifications are considered to lie within the scope of the present application.

I claim:

1. Weighing device for weighing a container to be moved by at least one arm system with a lifting device, comprising a support, a lifting arm having a first end and a second end, said lifting arm being pivotally connected at said first end to a point on the support, a weighing arm having a first end and a second end, said weighing arm being pivotally connected to the lifting arm at said first end of the weighing arm adjacent the point of connection of the lifting arm to the support, means attached to the second end of the weighing arm for detachably supporting a container to be weighed, and a load cell assembly disposed and acting between the second end of the lifting arm and said second end of the weighing arm adjacent said means for supporting a container.

2. Weighing device according to claim 1, comprising two parallel operating systems for accommodating the container between them.

3. Weighing device according to claim 1, in which inclination angle determining means are present in the arm system.

4. Weighing device according to claim 1, in which the weighing arm and the lifting arm are fitted in such a way that in the weighing position of the highest container to be weighed the measuring cell is in the optimum working range of said container.

5. Weighing device according to claim 1, in which a further measuring cell, designed to work essentially at right angles to the first measuring cell, is fitted in the weighing arm near the hinge point with the lifting arm.

6. Weighing device according to claim 1, in which a further measuring cell (20), operating in a different direction from measuring cell (13), is fitted in the lifting arm near the measuring cell (13).

7. Weighing device according to claim 1, in which the weighing arm is fitted above the lifting arm.

* * * * *